United States Patent [19]

Bratt

[11] 4,345,645
[45] Aug. 24, 1982

[54] HOT GAS ENGINE HEATER HEAD

[75] Inventor: Jan C. Bratt, Malmö, Sweden

[73] Assignee: Kommanditbolaget United Stirling AB & CO, Malmo, Sweden

[21] Appl. No.: 199,007

[22] Filed: Oct. 20, 1980

[51] Int. Cl.³ .............................................. F24J 3/00
[52] U.S. Cl. ...................... 165/176; 60/517; 60/524; 60/525; 126/442; 126/450
[58] Field of Search ...................... 126/442, 450, 451; 60/517, 524, 525; 165/176

[56] References Cited

U.S. PATENT DOCUMENTS

| | | | |
|---|---|---|---|
| 3,074,229 | 1/1963 | Baas et al. | 60/525 |
| 3,117,414 | 1/1964 | Daniels et al. | 60/525 X |
| 3,965,976 | 6/1976 | Barton | 60/517 X |
| 4,030,297 | 6/1977 | Kantz et al. | 60/525 X |
| 4,044,753 | 8/1977 | Fletcher et al. | 126/442 X |
| 4,055,953 | 11/1977 | Nederlof | 60/517 X |
| 4,069,670 | 1/1978 | Bratt et al. | 60/517 |
| 4,206,746 | 6/1980 | Chubb | 125/442 X |

FOREIGN PATENT DOCUMENTS

| | | | |
|---|---|---|---|
| 528864 | 8/1956 | Canada | 60/525 |
| 2432958 | 1/1976 | Fed. Rep. of Germany | 60/517 |
| 8151 | of 1900 | United Kingdom | 165/176 |

Primary Examiner—Sheldon J. Richter
Attorney, Agent, or Firm—Finnegan, Henderson, Farabow Garrett & Dunner

[57] ABSTRACT

A heater head for a multi-cylinder solar powered hot gas engine has a number of heater tubes lined on a conical wall exposed to the radiation.

The tubes follow involute curves in two parts. The first parts leave very small gaps between them. The second parts arranged at a larger diameter from the center of said wall follow another involute each tube now leaving such gap relative its neighbor that a returned tube part may be arranged between.

3 Claims, 4 Drawing Figures

HOT GAS ENGINE HEATER HEAD

BACKGROUND OF THE INVENTION

1. Field of the Invention

This invention relates to a multiple cylinder hot gas engine heater head in which a plurality of tubes connect the cylinders with corresponding regenerator housings and in which each tube has a first curved portion of a shape which corresponds substantially to the shape of an involute curve and in which the tubes are juxtaposed so that constant gaps between the curved portions are obtained.

2. Description of the Prior Art

The prior art is elucidated best e.g., in U.S. Pat. No. 4,069,670. In this prior publication the first curved portions of the tubes connect a quarter circle segment manifold of a central regenerator with a quarter circle segment of an outer manifold arranged at a larger distance from a central axis and forming connection to the top of a cylinder.

The curved portions of the tubes are located substantially to follow a cone and the connections to the cylinder manifolds are established through straight tube parts parallel to the central axis.

Heater heads of this type are commonly used in hot gas engines heated by combustion of fossil fuel.

However, in case of solar heated engines it is desirable to increase the length of the curved tube portions but such increase will cause a simultaneous increase of the straight tube parts in the structure of the prior art. As the straight tube parts cannot be readily exposed to sun radiation they may increase the dead volumes as well as the weight and cost of the heater head.

SUMMARY OF THE INVENTION

The object of the present invention is to provide a heater head of the type referred to above in which the the total length of the curved portions of the tubes may be increased without necessarily increasing the straight tube portions connected to the outer manifolds. According to the present invention this is obtained thereby that each tube has a second curved portion following an involute curve starting in continuation of the said first curved portion at such larger base circle that a multiple of tubes may be juxtaposed leaving substantially the same constant gap between them as exists between the first curved portions.

The invention and its difference from the prior art will be described in more detail reference being made to the accompanying drawings.

DETAILED DESCRIPTION OF THE DRAWINGS

Figure 1:
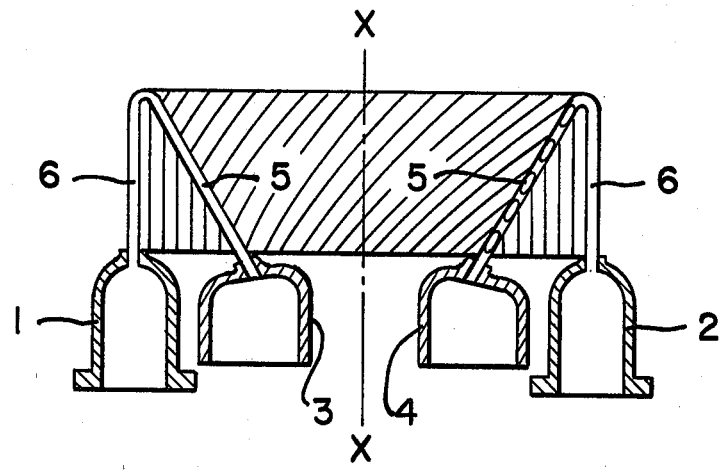
FIG. 1 shows schematically a vertical section through a heater head of known design.
Figure 2:
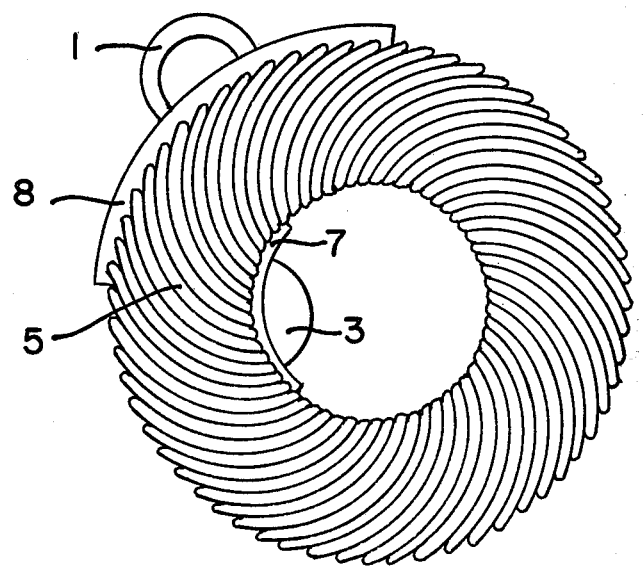
FIG. 2 shows parts of the head of FIG. 1 viewed from above.

Referring first to FIGS. 1 and 2 a heater head of the type described in U.S. Pat. No. 4,069,670 comprises cylinder tops 1 and 2 connected to respective regenerator housings 3 and 4 by means of heater tubes 5, 6 and manifolds 7, 8. Each tube comprises a first curved part 5 and a straight part 6. The parts 5 extend along involute curves. All the curved parts 5 are identically shaped and are arranged so as to leave equal gaps between them. Together they form a cone having an axis X—X. it will be understood that although the gaps between the parts 5 may be very small—in FIG. 2 so small that they are not shown—the gaps between the straight parts 6 may be substantial. The larger the diameter of the manifold 8 the larger the gaps will occur between the parts 6.

Figure 3:
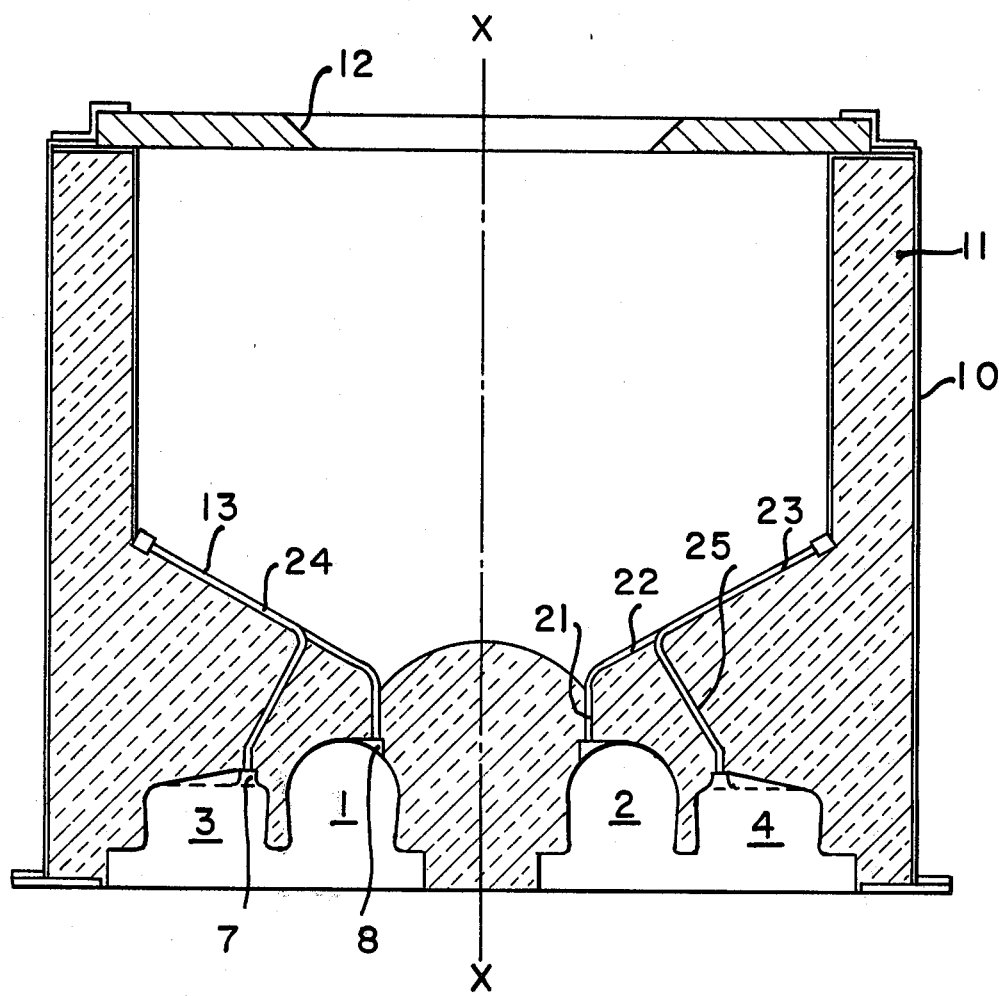
FIG. 3 shows a vertical section through a solar energy receiver together with a heater head according to the invention.

FIG. 3 shows a solar energy receiver comprising a double walled housing 10 filled with insulating material 11. An iris opening 12 allows solar radiation to enter into the housing directed towards a lower conically shaped wall 13. Said wall 13 is lined with heater tubes connecting manifolds 8 belonging to cylinder tops 1, 2 with manifolds 7 belonging to regenerator housing 3, 4.

All tubes are equally shaped comprising a first straight part 21, a first curved part 22 following an involute on a cone, a second curved part 23 following another involute on a cone, a third curved part 24 following an involute corresponding to that of the second curved part 23 but in the reverse direction and a basically straight part 25 extending the shortest possible way between the wall 13 and the regenerator housing manifold 7.

Figure 4:
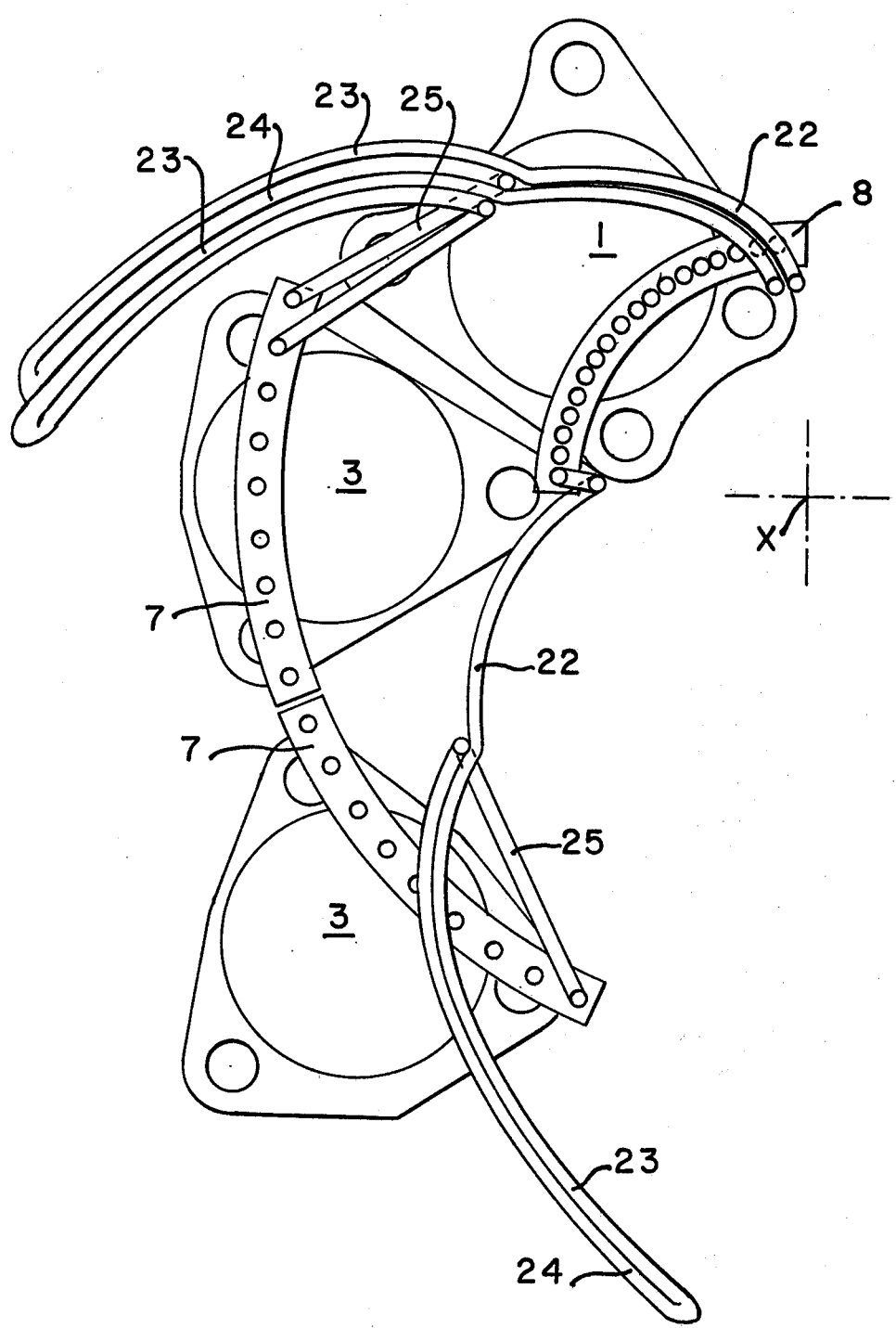
FIG. 4 shows parts of a quadrant of the heater head of FIG. 3 viewed from above.

FIG. 4 shows a quadrant of the heater head used in FIG. 3 viewed from above. One cylinder top 1 having a manifold 8 extending along 90 degrees of a circle is connected by heater tubes to the manifolds 7 which together form 90 degrees of a circle having larger diameter than that of the manifold 8. The center of the manifold circles is marked by X corresponding to the axis of symmetry X—X in FIG. 3. The manifolds 7 belong to regenerator housings 3.

Only three heater tubes are shown, but all tubes are of equal shape and are arranged equally spaced apart as to any diameter of the heater head. Each tube comprises a first curved part 22 following an involute on the cone of FIG. 3 and a second curved part 23 following another involute curve on the cone. At the extreme end of each tube the tube is bent 180 degrees and returned as a thid curved part 24 along an involute of the same shwape as the second curved part 23. The gaps between the tubes may be very small and substantially equal. The length of the curved parts 23 and 24 may be according to wish. The length of the parts 22 must be sufficient to allow the beginning of the curved parts 23 (following a new involute having a greater base circle) at such mutual distances as to allow one or more tube parts 24 of equal shape to be arranged between them with appropriate gaps (preferably very small gaps).

The straight tube parts 25 connecting the parts 24 with the manifolds 7 are not exposed to solar radiation. Therefore they should be as short as possible.

The mirror used for concentration of the solar radiation passing the iris opening 12 of FIG. 3 has not been shown. A parabolic mirror governed to follow the relative movement between earth and sun may be used.

I claim:

1. A multiple cylinder hot gas engine heater head in which a plurality of tubes connect the cylinders with the corresponding regenerator housings and in which each tube has a first curved part of a shape which corresponds substantially to the shape of an involute curve on a cone and in which the inner ends of the tubes start on a base circle and the first curved parts are juxtaposed so that constant gaps between the curved parts are obtained, characterized in that each tube has a second curved part following a different involute curve on the same cone starting in continuation of the said first curved part wherein the second curved parts are juxtaposed leaving a constant gap between the second curved parts.

2. A heater head according to claim 1 wherein said second curved parts have inner end sections spaced apart on a larger base circle than said base circle.

3. A heater head according to claim 1 characterized in that the outer end section of the second curved part of each tube is bent 180 degrees and follows the different involute curve towards said larger base circle, each outer end section lying between two inner end sections and being juxtaposed to leave the same constant gap there-between as between said first curved parts.

* * * * *